Dec. 8, 1936.  H. R. TEAR  2,063,411

LUBRICATING DEVICE

Filed Aug. 27, 1935

INVENTOR
HARRY R. TEAR.
BY
ATTORNEY

Patented Dec. 8, 1936

2,063,411

UNITED STATES PATENT OFFICE 2,063,411

LUBRICATING DEVICE

Harry R. Tear, Evanston, Ill., assignor to The Lubrication Corporation, Chicago, Ill., a corporation of Delaware Application August 27, 1935, Serial No. 38,067

10 Claims. (Cl. 221—47.4)

This invention relates to lubricating devices and more particularly to hand guns or pumps for dispensing lubricant from interchangeable cartridges or original packages of lubricant.

In servicing an automobile or other piece of machinery it is often necessary to use a number of different types of lubricant to meet the varying requirements of different parts. It has been proposed to perform this "specialized" lubrication service by employing a single gun and using in conjunction therewith interchangeable lubricant cartridges which may contain different types of lubricant to suit the demands of the various parts to be lubricated. By this means a single gun may be used to dispense a number of different types of lubricant in succession by merely interchanging the cartridges in the gun, thus dispensing with the necessity for a separate complete gun for each different type of lubricant.

In the prior application of Harry R. Tear and Adiel Y. Dodge, Serial Number 727,604, a cartridge type gun was disclosed and claimed in which the high pressure pump parts could be locked in position at the end of their discharge stroke, or in that position in which the pump contained the minimum quantity of lubricant, during interchange of cartridges. This is a highly desirable feature since it prevents any material commingling of lubricants of different types and insures that, when a cartridge has been changed, the new type of lubricant will be dispensed at each pumping stroke after the first. However, in using the gun of the above mentioned application it was occasionally found that the pump parts accidentally became locked during a dispensing or pumping operation and required manual release by the operator before servicing of the bearing could continue.

Accordingly one of the primary objects of the present invention is to provide a lubricating device in which accidental locking of the pump parts is prevented.

The utility of a lubricant device of the type described is considerably enhanced by the addition of an angle adapter at the nozzle end, thereby making accessible lubricant-receiving fittings located at inconvenient or relatively inaccessible angles. When such an angle adapter is used, it is desirable to have no relative rotation between the barrel or body of the gun and the nozzle so that the direction assumed by the angular nozzle may be readily controlled by the operator.

Another object of the invention, therefore, is to provide a hand-operated lubricant gun including a pump having locking means and having telescoping parts, relative rotation of which is prevented, thereby permitting the use of an angular extension or nozzle.

Another object is to provide a pump including telescopic, non-rotatable parts and means to lock the parts in their discharged position for the interchange of lubricant cartridges.

Other and further objects, the advantages and novel features of the invention will be apparent from the following detail description when taken in connection with the accompanying drawing, in which.

Figure 1:
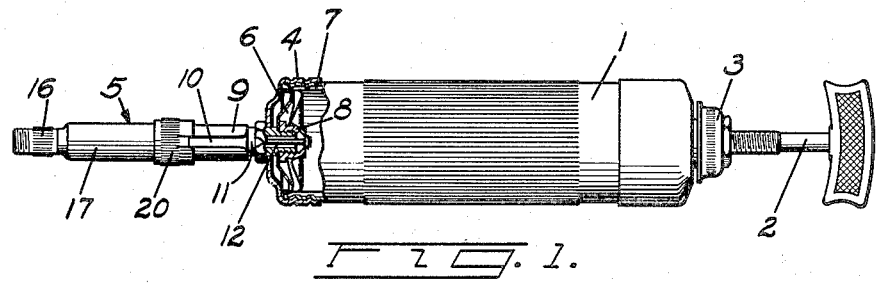
Fig. 1 is an elevation with parts in section of a lubricating device embodying the invention.

Fig. 1 illustrates a cartridge type gun embodying the invention and constituted by a casing 1 having a feed screw 2 projecting through the rear end thereof and through a quick-release device 3 by which the feed screw can be engaged for screw threaded movement or released for free axial movement. The front of the casing 1 is closed by a cap 4 having a central opening through which projects the inlet end of a high pressure pump indicated generally at 5. The pump 5 carries inside of the casing 1 a connector plate 6 formed with notched and sloped edges to make a rigid bayonet connection with the end of an interchangeable lubricant cartridge 7. The end of the cartridge 7 is formed with an outlet opening of spherical contour to make a lubricant tight seal with the spherical surface of a connector stud 8 which forms the pump inlet and the other end of the cartridge may be closed by a movable piston, not shown, which may be engaged by the feed screw 2 to force the lubricant from the cartridge.

Figure 2:
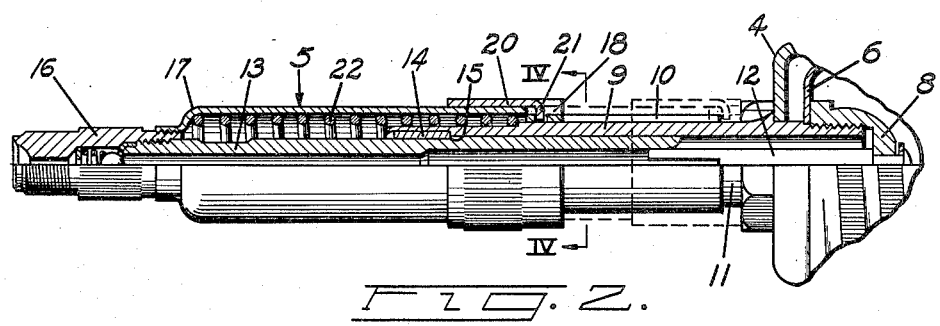
Fig. 2 is an enlarged view of the pump of Fig. 1 with parts in section and parts in elevation.

The pump 5 as best seen in Fig. 2, is constituted by a tubular pump body 9 which is rigidly attached to the connector plate 6 and stud 8 and which is formed on its exterior with a longitudinally extending groove 10 and a circumferentially extending groove 11 adjacent its inner end. A piston or plunger 12 is mounted coaxially in the sleeve 9, and is preferably secured to the stud 8 by means of a floating mounting to permit it to aline itself. A pump cylinder 13 is slidable in the sleeve 9 and is adapted to receive the plunger 12 in its open end whereby relative movement of cylinder 13 and plunger 12 will eject lubricant, interlocking shoulders 14 and 15, one of which may take the form of packing, preferably being formed on members 9 and 13 to limit outward movement of the cylinder 13. The outer end of cylinder 13 is connected to a nozzle 16 of any desired type but which is preferably capable of forming a sealing connection with a lubricant receiving fitting by being thrust against the fitting. In this way the same force which seals the nozzle on the fitting serves also to force the member 13 into the sleeve 9 and over the plunger 12 to eject lubricant.

A tubular sleeve 17 is secured to the nozzle 16 and cylinder 13 and telescopes over the body 9 and is preferably formed with a projecting portion 18 which slides in the groove 10 to prevent relative rotation between the body 9 and the sleeve 17 and cylinder 13. The sleeve 17 has a peripheral slot 19 cut therein adjacent its inner end and has a sleeve or collar 20 rotatably mounted thereon. The collar 20 is slit adjacent one end and is bent inwardly to form a projecting tongue 21 which extends through the slot 19 and into the groove 10. Preferably a compression spring 22 is arranged between the sleeve 17 and a shoulder on the body 9 to urge the sleeve 17 and cylinder 13 outwardly.

Figures 3, 4:
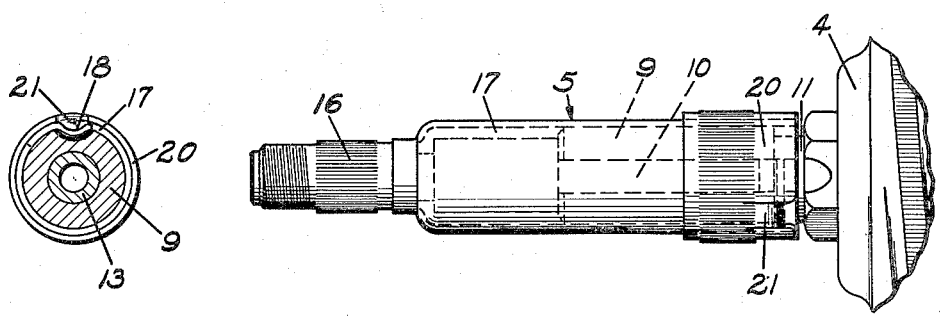
Fig. 3 is a view of the pump of Fig. 2 with the parts in locked position.
Fig. 4 is a section on the line IV—IV of Fig. 2.

During normal operation as the relatively telescoping parts are reciprocated, rotation of the sleeve 17 relative to the body 9 is prevented by the projection 18 sliding in the groove 10 and the sleeve or collar 20 is held from rotation by engagement of the tongue 21 with the groove 10 and by friction between the collar and the sleeve 17. The pump may be locked in discharge position as shown in Fig. 3 by first telescoping the sleeve 17 and cylinder 13 inwardly to the end of the pump discharge stroke and then turning the sleeve 20 so that the tongue 21 thereon will move in the slot and enter the circumferential groove 11 and lock the sleeve 17 against axial movement relative to the body 9.

It will be noted that in this position substantially all of the lubricant except that remaining in the bore of cylinder 13 ahead of the plunger has been forced out of the pump and since this amount is not greater than the displacement of the plunger, it will be completely forced out on the next pumping stroke. To operate the pump again, it is necessary only to turn the collar 20 until the tongue 21 is alined with the groove 10 and the parts are once more free to reciprocate under the alternating influence of the spring 22 and an applied thrust.

Figures 5, 6, 7, 8:
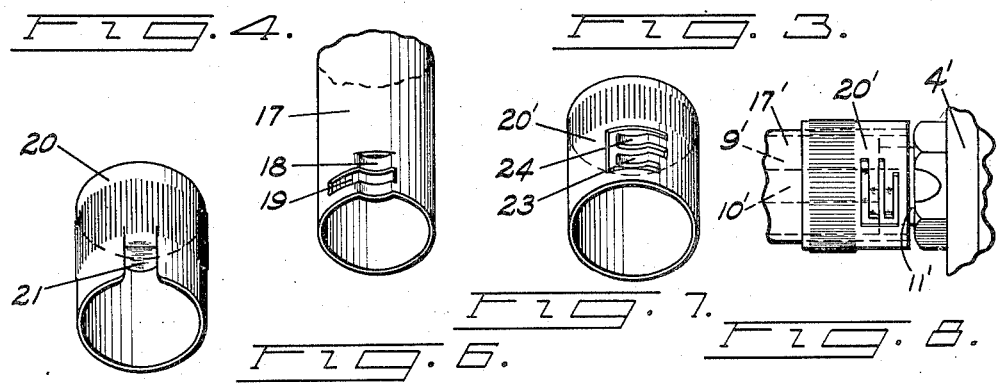
Fig. 5 is a perspective view of the locking collar of Figs. 1 to 4.
Fig. 6 is a partial perspective view of the pump sleeve of Figs. 1 to 4.
Fig. 7 is a perspective view of a modified form of locking collar.
Fig. 8 is a partial view illustrating the collar of Fig. 7 assembled on a pump.

Figures 7 and 8 illustrate a modified form of locking collar, parts in these figures corresponding to like parts in Figs. 1 to 5 being indicated by the same reference numbers primed. Instead of the tongue 21 of Figs. 1 to 6, the collar 20' of Figs. 7 and 8 is formed with two peripherally extending tongues 23 and 24. The tongue 23 extends through a slot in the sleeve 17' similar to the slot 19 in Figs. 1 to 5 and is adapted to be turned into the groove 11' to lock the pump parts in their discharge position. The tongue 24 engages in a depressed portion of the sleeve 17' similar to the portion 18 of Figs. 1 to 5 and serves as a spring detent to yieldingly hold the sleeve 17' against rotation.

While two embodiments of the invention have been shown and described, it will be apparent that many changes might be made therein and it is not intended that the scope of the invention shall be limited to the embodiments shown or otherwise than by the terms of the appended claims.

I claim:

1. A lubricating device comprising, a high pressure pump including relatively telescoping parts said parts including interengaging means to hold them against relative rotation at all times, a source of lubricant supply for said pump, and means movable with respect to said pump parts for holding the parts in lubricant discharged position.

2. A lubricating device comprising, a high pressure pump including relatively telescoping parts and means to hold said parts against relative rotation at all times, a source of lubricant supply for said pump, and means movably carried by one of said pump parts and engageable with another thereof for locking said pump parts in lubricant discharged position.

3. A lubricating device comprising, a high pressure pump including relatively telescoping parts and means to hold said parts against relative rotation at all times, a source of lubricant supply for said pump, and a sleeve rotatably mounted on one of said pump parts and having a projecting portion engageable with another of said parts to lock the parts in lubricant discharged position.

4. A lubricating device comprising, a casing, an interchangeable lubricant supply cartridge in said casing, a piston in the cartridge, means carried by said casing for urging said piston through the cartridge to force lubricant therefrom, a high-pressure pump carried by the casing and connected to receive lubricant from the cartridge, said pump including relatively telescoping parts and means to hold said parts against relative rotation at all times, and means carried by said pump to lock the parts in lubricant discharged position.

5. A lubricating device comprising, a casing, an interchangeable lubricant supply cartridge in said casing, a piston in said cartridge, means carried by said casing for urging said piston through the cartridge to force lubricant therefrom, a high-pressure pump carried by the casing and connected to receive lubricant from the cartridge, said pump including relatively telescoping parts and means to hold said parts against relative rotation at all times, and a sleeve rotatably carried by one of said parts and engageable with another thereof to lock said parts in lubricant discharged position.

6. In a lubricating device, a pump comprising, relatively telescoping parts, one of said parts having a longitudinal groove and another of said parts having a projection slidable in said groove whereby relative rotation of the parts is prevented at all times, and means for locking said parts in lubricant discharged position.

7. In a lubricating device, a pump comprising, relatively telescoping parts, one of said parts having a longitudinal groove and another of said parts having a projection slidable in said groove whereby relative rotation of the parts is prevented, and a sleeve rotatably carried by one of said parts and having a projection engageable with another of the parts upon rotation thereof to lock the parts in lubricant discharged position.

8. In a lubricating device, a pump comprising, a pair of relatively telescopic members, the inner of said members having a longitudinal groove and a circumferential groove, the outer of said members having an inward projection slidably disposed within said longitudinal groove and having a circumferential slot, and a collar mounted on said outer sleeve and having a projection extending through said slot into said longitudinal groove, said collar being rotatable to move said projection into said circumferential groove to lock the pump parts in predetermined position.

9. In a lubricating device, a pump comprising, a pair of relatively telescopic members, the inner of said members having a longitudinal groove and a circumferential groove, the outer of said members having an inward projection slidably disposed within said longitudinal groove and having a circumferential slot, and a collar mounted on said outer sleeve and having an axially extending bent-down tongue extending through said slot into said longitudinal groove, said collar being rotatable to move said tongue into said circumferential groove to lock the pump parts in predetermined position.

10. In a lubricating device, a pump comprising, a pair of relatively telescopic members, the inner of said members having a longitudinal groove and a circumferential groove, the outer of said members having an inward projection slidably disposed within said longitudinal groove and having a circumferential slot, and a collar mounted on said outer sleeve and having a circumferentially extending bent-down tongue extending through said slot into said longitudinal groove, said collar being rotatable to move said tongue into said circumferential groove to lock the pump parts in predetermined position.

HARRY R. TEAR.